(12) United States Patent
Barnett

(10) Patent No.: US 8,874,912 B2
(45) Date of Patent: Oct. 28, 2014

(54) SYSTEMS AND METHODS FOR SECURELY TRANSFERRING PERSONAL IDENTIFIERS

(75) Inventor: Timothy W. Barnett, Roswell, GA (US)

(73) Assignee: Accullink, Inc., Huntsville, AL (US)

( * ) Notice: Subject to any disclaimer, the term of this patent is extended or adjusted under 35 U.S.C. 154(b) by 20 days.

(21) Appl. No.: 13/252,884

(22) Filed: Oct. 4, 2011

(65) Prior Publication Data

US 2013/0086382 A1 Apr. 4, 2013

(51) Int. Cl.
| | | |
|---|---|---|
| H04L 9/32 | (2006.01) | |
| H04L 29/06 | (2006.01) | |
| G06F 21/00 | (2013.01) | |
| G06F 7/04 | (2006.01) | |
| G06F 12/14 | (2006.01) | |
| G06Q 20/00 | (2012.01) | |
| H04L 9/08 | (2006.01) | |

(52) U.S. Cl.
CPC .............. *G06F 21/00* (2013.01); *H04L 9/3236* (2013.01); *H04L 9/32* (2013.01); *H04L 9/3226* (2013.01); *H04L 9/0827* (2013.01)
USPC ........... 713/168; 713/161; 713/165; 713/166; 713/170; 713/182; 713/184; 726/5; 726/6; 726/22; 705/64; 705/67; 705/72; 705/74

(58) Field of Classification Search
USPC ......... 713/168, 161, 165, 166, 170, 182, 184; 726/5, 6, 22; 705/64, 67, 72, 74
See application file for complete search history.

(56) References Cited

U.S. PATENT DOCUMENTS

| | | | |
|---|---|---|---|
| 5,903,878 | A | 5/1999 | Talati |
| 6,209,104 | B1 | 3/2001 | Jalili |
| 7,249,093 | B1 | 7/2007 | King |
| 7,526,652 | B2 | 4/2009 | Ziegler |
| 2003/0182558 | A1* | 9/2003 | Lazzaro et al. ............... 713/183 |
| 2006/0037067 | A1 | 2/2006 | Morris et al. |
| 2008/0282091 | A1* | 11/2008 | Ashok et al. .................. 713/183 |
| 2009/0080662 | A1* | 3/2009 | Thibadeau .................... 380/286 |
| 2009/0261162 | A1 | 10/2009 | Kargman et al. |
| 2010/0146605 | A1* | 6/2010 | Hammell et al. ................. 726/7 |
| 2010/0228987 | A1* | 9/2010 | Dinov ........................... 713/183 |
| 2011/0055593 | A1* | 3/2011 | Lurey et al. ................... 713/193 |
| 2011/0087888 | A1* | 4/2011 | Rennie .......................... 713/182 |
| 2012/0252409 | A1* | 10/2012 | Cao ................................. 455/410 |

* cited by examiner

*Primary Examiner* — Aravind Moorthy
(74) *Attorney, Agent, or Firm* — Maynard, Cooper & Gale, P.C.; Jon E. Holland

(57) ABSTRACT

A system for transferring secured data has an authentication facilitator that transmits data indicative of a graphical key pad to a remote display device of a user computing device and, in response, receives from the user computing device icon location data indicative of locations of icons selected by a user. Additionally, the authentication facilitator recovers a personal identifier (PI) from the icon location data, translates the recovered PI to obtain a translated PI, and transmits the translated PI. The system further has a partner computing apparatus that receives the translated PI and allows the user access to a secured area based upon the translated PI.

27 Claims, 11 Drawing Sheets

SYSTEMS AND METHODS FOR SECURELY TRANSFERRING PERSONAL IDENTIFIERS

RELATED ART

There are a variety of transactions that typically involve a user or consumer providing an identification number, e.g., a personal identification number (PIN) when performing a transaction. In such transactions, this is often referred to as "authentication" of the user or consumer.

In some cases, a personal identification number (PIN) is used to authenticate the user or consumer who provides an account identifier in order to deter and prevent fraudulent use of the consumer's account. However, the use of a PIN can be burdensome to a consumer who is required to memorize the PIN and provide the PIN during the transaction. Furthermore, PIN use in financial transactions is highly regulated, making the transmission of PINs over a network more difficult.

In some cases, a user may use a PIN to obtain access to a physical location, e.g., a building. In this regard, some doors may have coupled to them a PIN pad. A user who desires to enter the door may have to enter a PIN into the PIN pad in order for the door to automatically open.

There are also websites that have limited access web pages. In this regard, a website might have a secured webpage that a consumer or user can only get access to if he/she enters a PIN number. If the user enters the PIN number correctly, the web page is displayed.

In this regard, despite security measures for protecting account identifiers, a hacker or other unauthorized user can gain access to a user's or consumer's account identifier and PIN as they are being transmitted during a financial transaction or any other transaction in which a PIN is used to allow the user or consumer access.

In addition, account identifiers and PINs can be captured by key logging, which is a process by which malicious software captures a user's keystrokes in an effort to discover sensitive information. Also, unscrupulous employees of the merchant may misuse an account identifier that has been transmitted to the merchant. Further, merchants often store account identifiers in databases that are susceptible to hacking and other intrusions. Such threats are well-known and result in the loss of millions of dollars annually to the financial industry. Despite such losses, many financial institutions issue accounts without attempting to protect the accounts through PINs and other security measures that are burdensome to consumers.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1A:
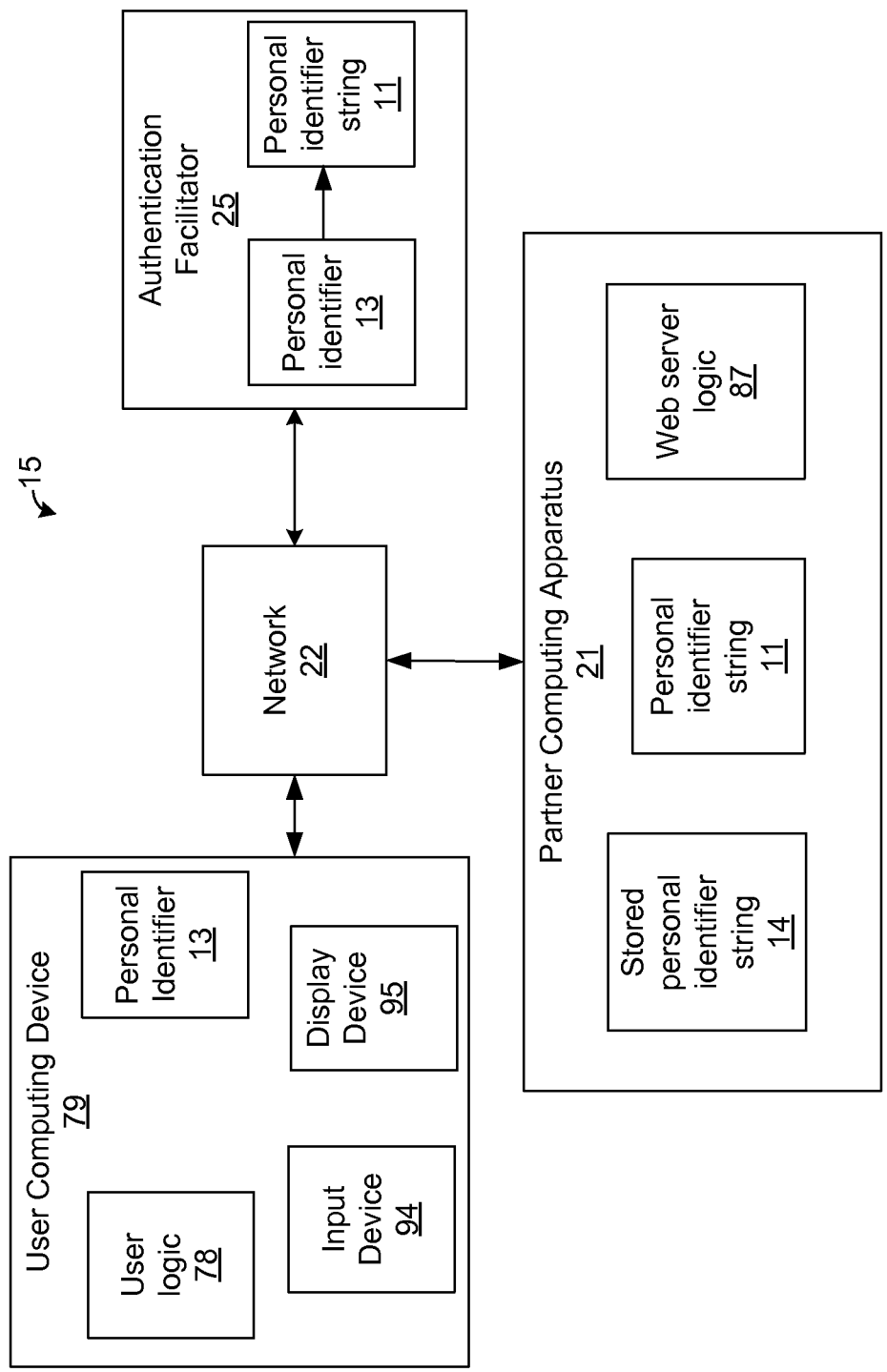
FIG. 1A is a block diagram illustrating an exemplary embodiment of a secured data transfer system for use in providing access to a secured portion of a website.

The present disclosure generally pertains to systems and methods for securely transferring secured data, such as for example personal identifiers. In this regard, a partner computing device receives secured data, and the partner computing device may perform various operations based upon the secured data received. As an example, the partner computing device may receive secured data and enable a user of a user computing device to obtain access to a secured portion of a website or a secured facility, for example. In such an embodiment, the partner computing apparatus may not need the actual data input by the user, only a representation of the secured data that the partner computing apparatus may use to determine whether the user is approved for access. As another example, the partner computing device may receive secured data, such as personal data (e.g., a social security number), from a user that the partner computing device uses in performing an operation for the user, such as, for example, creating an account for the user. In such an embodiment, the partner computing apparatus may need the actual data input by the user to perform such operation.

In one embodiment, a user enters a personal identifier, for example his/her personal identification number (PIN), into an input device of a user computing device, and the user computing device transmits data indicative of the personal identifier to an authorization manager. The authorization manager translates the personal identifier received and transmits the translated personal identifier to the partner computing device.

In one embodiment, if the translated personal identifier received by the partner computing device matches data indicative of a personal identifier stored in the partner computing apparatus, the partner computing device allows the user access. If not, the partner computing apparatus denies the user access.

In another embodiment, similar to the above-described embodiment, the data may be secured data indicative of personal data. In this regard, the user enters the personal data, for example a social security number, into an input device. Data indicative of the personal data is transmitted to the authorization manager. The authorization manager translates the personal data, and transmits the translated personal data to the partner computing device. In one embodiment, the partner computing device may have previously transmitted an encryption key to the authorization manager with which the authorization manager uses to encrypt the personal data before sending the personal data to the partner computing device. Once the partner computing device receives the encrypted personal data, the partner computing device uses a key corresponding to the key previously used by the authorization manager to decrypt the data. The partner computing device may perform different operations based upon the received decrypted personal data. In this regard, the partner computing device may compare the received personal data to data previously stored by the partner computing device and enable the user access, for example to a secured portion of a website or a secured facility. In another embodiment, the partner computing device may store the secured data and use the secured data, for example, to set up an account for the user on the personal computing device.

FIG. 1A depicts an embodiment of an exemplary system 15 in accordance with the present disclosure. In system 15, a third party device translates received secured data and transmits the translated secured data to a partner computing apparatus 21. In one embodiment, the secured data received is a personal identifier provided by a user, and the partner computing apparatus 21 enables the user access to a secured portion of a website if the personal identifier is authenticated with the user.

As shown by FIG. 1, the system 15 comprises an authentication facilitator 25 and the partner computing apparatus 21. The authentication facilitator 25 and the partner computing apparatus 21 communicate via a network 22.

The partner computing apparatus 21 comprises web server logic 87 and a stored personal identifier string 14. Further, the partner computing apparatus 21 periodically comprises a personal identifier string 11 that is received from the authentication facilitator 25 during operation.

The partner computing apparatus 21 may be any computing apparatus, such as a desk-top or lap-top computer, a server, or other type of apparatus capable of processing secured data transactions and communicating with the network 22. The partner computing apparatus 21 is further capable of communicating with the authentication facilitator 25 and a user computing device 79. Further, the authentication facilitator 25 may be any computing apparatus, such as a desk-top or lap-top computer, a server, or other type of apparatus capable of processing data transfer transactions and communicating with the network 22.

The web server logic 87 delivers web pages to browser logic (not shown) that is local or remote. A remote user computing device 79 is depicted in FIG. 1. Where a remote user computing device 79 is used in implementation of the system 15, the web server logic 87 transmits data indicative of web pages that the user computing device 79 displays to the display device 95 using hypertext transfer protocol (HTTP).

Note that the user computing device 79 is shown as physically remote from the partner computing apparatus 21 and having an input device 94 and a display device 95. However, the input device 94 and the display device 95 may be local components of the partner computing apparatus 21 in other embodiments of the system 15.

As will be described in more detail hereafter, the authentication facilitator 25 receives data indicative of a personal identifier 13 from the user computing device 79. Such personal identifier 13 is entered by the user through the input device 94. In this regard, the user may navigate to a particular web page (not shown) of a website that is delivered by the web server logic 87 and rendered on the display device 95. When the user desires to navigate to a secured portion of the website and selects a link that identifies the secured portion, the web server logic 87 redirects control of what is transmitted to the display device 95 to the authentication facilitator 25. In response to the redirection, the authentication facilitator 25 transmits data indicative of a graphical key pad to the user computing device, and user logic 79 displays a graphical key pad to the display device 95. The user then selects those numbers of his/her personal identifier 13 using the graphical key pad (preferably with a mouse or touch screen). Note that the personal identifier 13 may be a personal identification number (PIN) or other personal data (e.g., a social security number).

As noted herein, in one embodiment, the authentication facilitator 25 applies a hash function to the received personal identifier 13 to obtain the personal identifier string 11. In such an embodiment, the partner computing apparatus 21 has a previously stored personal identifier string 14, which is the personal identifier 13 after a hash function has been applied. Notably, the stored personal identifier string 14 is the personal identifier 13 after the hash function (used by the authentication facilitator 25) has been applied to the personal identifier 13. In such an embodiment, the partner computing device 21 does not necessarily need access to the actual digits making up the personal identifier 13. The partner computing apparatus 21 only needs to determine whether the personal identifier string 11 received from the authentication facilitator 25 matches the stored personal identifier string 14.

In another embodiment, the partner computing apparatus 21 may need to know the actual data contained in the personal identifier string 11. In such an embodiment, the authentication facilitator 25 may store an encryption key corresponding to a decryption key stored on the partner computing apparatus 21. In one embodiment, the partner computing apparatus 21 transmits the key that the authentication facilitator 25 uses to encrypt the personal identifier 13 to obtain the personal identifier string 11 prior to sending the personal identifier string 11 to the partner computing apparatus 21. Notably, any type of encryption scheme may be used to translate the secured data before transmitting the secured data to the partner computing apparatus 21.

In such an embodiment, the partner computing apparatus 21 decrypts the personal identifier string 11 using the corresponding decryption key. The partner computing apparatus 21 may perform particular operations based upon the personal identifier 13 obtained from the decryption. For example, the partner computing apparatus 21 may compare the personal identifier 13 with personal identifier data (not shown) previously stored on the partner computing apparatus 21 and enable the user access to a facility or secured portion of a website. Additionally, the partner computing apparatus 21 may store the personal identifier 13 and use the personal identifier 13 to set up an account for the user, for example.

Note that the user's personal identifier 13 may be a four-digit personal identification number (PIN), as indicated hereinabove or any other length in other embodiments. In this regard, the personal identifier 13 may be four numerical digits. As another example, the personal identifier 13 may be a four-digit string of characters and/or letters. The personal identifier 13 may also be any combination of digits or characters that is unique to the user that the user can enter into the graphical key pad.

As indicated hereinabove, the partner computing apparatus 21 receives the personal identifier string 11, which is data translated from the personal identifier 13. In one embodiment, the partner computing apparatus 21 comprises a stored personal identifier string 14. In such an embodiment, the stored personal identifier string 14 is received by the partner computing apparatus 21 during a registration process of the input device, which is described further herein.

Further, in the embodiment, the partner computing apparatus 21 may compare the personal identifier string 11 to the stored personal identifier string 14. If the personal identifier string 11 corresponds (e.g., matches) the stored personal identifier string 14, the web server logic 87 enables the user to access the secured portion of the website (not shown).

Figure 1B:
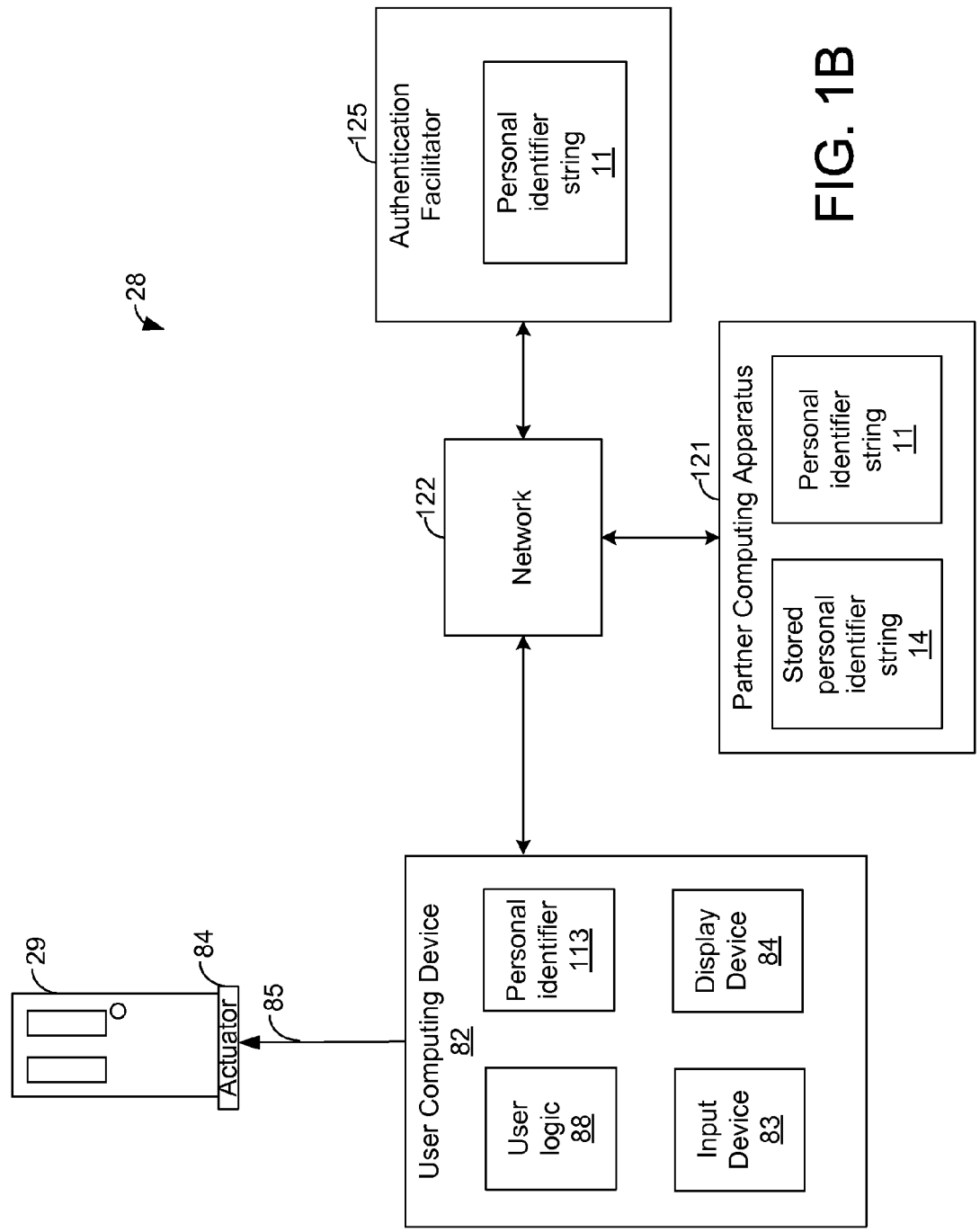
FIG. 1B is a block diagram illustrating an exemplary embodiment of a secured data transfer system for use in providing access to a facility through an input device communicatively coupled to a door actuator.

FIG. 1B depicts an embodiment of another exemplary system 28 in accordance with the present disclosure. In the embodiment of FIG. 1B, the system 28 grants a user access to a secured facility. In one embodiment, the secured data received is a personal identifier, e.g., a PIN or a social security number, provided by a user, and the partner computing apparatus 21 enables the user access to a secured area if the personal identifier is authenticated with the user. In the embodiment shown with reference to FIG. 1B, the secured area is a secured facility, e.g., a building.

As shown by FIG. 1B, the system 28 comprises an authentication facilitator 125 and a partner computing apparatus 121 substantially similar to the system 15 depicted in FIG. 1A. The authentication facilitator 125 and the partner computing apparatus 121 communicate via a network 122.

The user computing device 82 comprises an input device 83 and a display device 84. Additionally, the user computing device 82 comprises user logic 78. The user logic 78 may be software, hardware, or a combination thereof.

The user computing device 82 may be any type of computing device capable of communicating (i.e., sending and receiving data) with the authentication facilitator 25 via the network 22, receiving local input data from a user through the input device 83, and displaying output data to the user through the display device 84, as described herein. In one exemplary embodiment, the user computing device 82 can be operated by a user to enable the user to enter his/her personal identifier 113.

The input device 83 is a device for entering the secured data, and the display device 84 is for displaying data indicative of an account inquiry. In this regard, the user logic 78 is logic that controls receiving data, transmitting data, displaying data, and activating an actuator 86 that opens a door 29. The user logic 78 may be software, hardware, firmware, or a combination thereof.

The user logic 78 receives a personal identifier 13 through the input device 83 and stores the personal identifier 13 locally. The user logic 78 transmits the personal identifier 13 to the authentication facilitator 25 via the network 22. The user may enter the unique string of data into the input device 83 to enable the user access, for example to a building or to a particular secured section of a website (not shown). The user's personal identifier 13 may be a four-digit personal identification number (PIN), as indicated hereinabove. In this regard, the personal identifier 13 may be four numerical digits. As another example, the personal identifier 13 may be a four-digit string of characters and/or letters. The personal identifier 13 may also be any combination of digits or characters that is unique to the user that the user can enter into the user computing device 79.

The authentication facilitator 25 may be any computing apparatus, such as a desk-top or lap-top computer, a server, or other type of apparatus capable of processing data transfer transactions and communicating with the network 22, as described herein.

The authentication facilitator 25 receives the personal identifier 13 from the user computing device 82 via the network 22. The authentication facilitator 25 translates the personal identifier 13 into a personal identifier string 11. The personal identifier string 11 may be obtained from the personal identifier 13 through a translation method. For example, the authentication facilitator 25 may encrypt the personal identifier 13 or the authentication facilitator 25 may apply a hash function to the personal identifier 13, as described further herein. Once the personal identifier string 11 is created, the authentication facilitator 25 transmits the personal identifier string 11.

As noted herein, in one embodiment, the authentication facilitator 25 applies a hash function to the personal identifier 13 to obtain the personal identifier string 11. In such an embodiment, the partner computing apparatus 21 has a previously stored personal identifier string 14. Notably, the stored personal identifier string 14 is the personal identifier 13 after a hash function has been applied to the personal identifier 13, such hash function applied is the same hash function applied by the authentication facilitator 25. In such an embodiment, the partner computing device 21 does not necessarily need access to the personal identifier 13. The partner computing apparatus 21 only needs to determine whether the personal identifier string 11 received from the authentication facilitator 25 matches the stored personal identifier string 14.

In another embodiment, the partner computing apparatus 21 may need to know the actual data contained in the personal identifier string 11. In such an embodiment, the authentication facilitator 25 may store an encryption key corresponding to a decryption key stored on the partner computing apparatus 21. In one embodiment, the partner computing apparatus 21 transmits the key that the authentication facilitator 25 is to use to encrypt the personal identifier 13 to obtain the personal identifier string 11 prior to sending the personal identifier string 11 to the partner computing apparatus 21. As indicated hereinabove, the partner computing apparatus 21 decrypts the personal identifier string 11 using the corresponding key and may perform operations based upon the personal identifier 13 obtained from the decryption. For example, the partner computing apparatus 21 may compare the personal identifier 13 with personal identifier data (not shown) previously stored on the partner computing apparatus 21 and enable the user access to a facility or secured portion of a website. Additionally, the partner computing apparatus 21 may store the personal identifier 13 and use the personal identifier 13 to set up an account for the user, for example.

The partner computing apparatus 21 may be any computing apparatus, such as a desk-top or lap-top computer, a server, or other type of apparatus capable of processing secured data transactions and communicating with the network 22, as described herein. The partner computing apparatus 21 is further capable of communicating with the authentication facilitator 25 and the user computing device 79.

The partner computing apparatus 21 receives the personal identifier string 11, which is data translated from the personal identifier 13. In one embodiment, the partner computing apparatus 21 comprises a stored personal identifier string 14. In such an embodiment, the stored personal identifier string 14 is received by the partner computing apparatus 21 during a registration process of the user computing device 79, which is described further herein.

Further, in the embodiment, the partner computing apparatus 21 may compare the personal identifier string 11 to the stored personal identifier string 14. If the personal identifier string 11 corresponds (e.g., matches) the stored personal identifier string 14, the partner computing apparatus 21 transmits a signal to the user computing device 79 via a connection 85 to a door 29. The signal activates an actuator 84, which opens the door 29.

Figure 2:
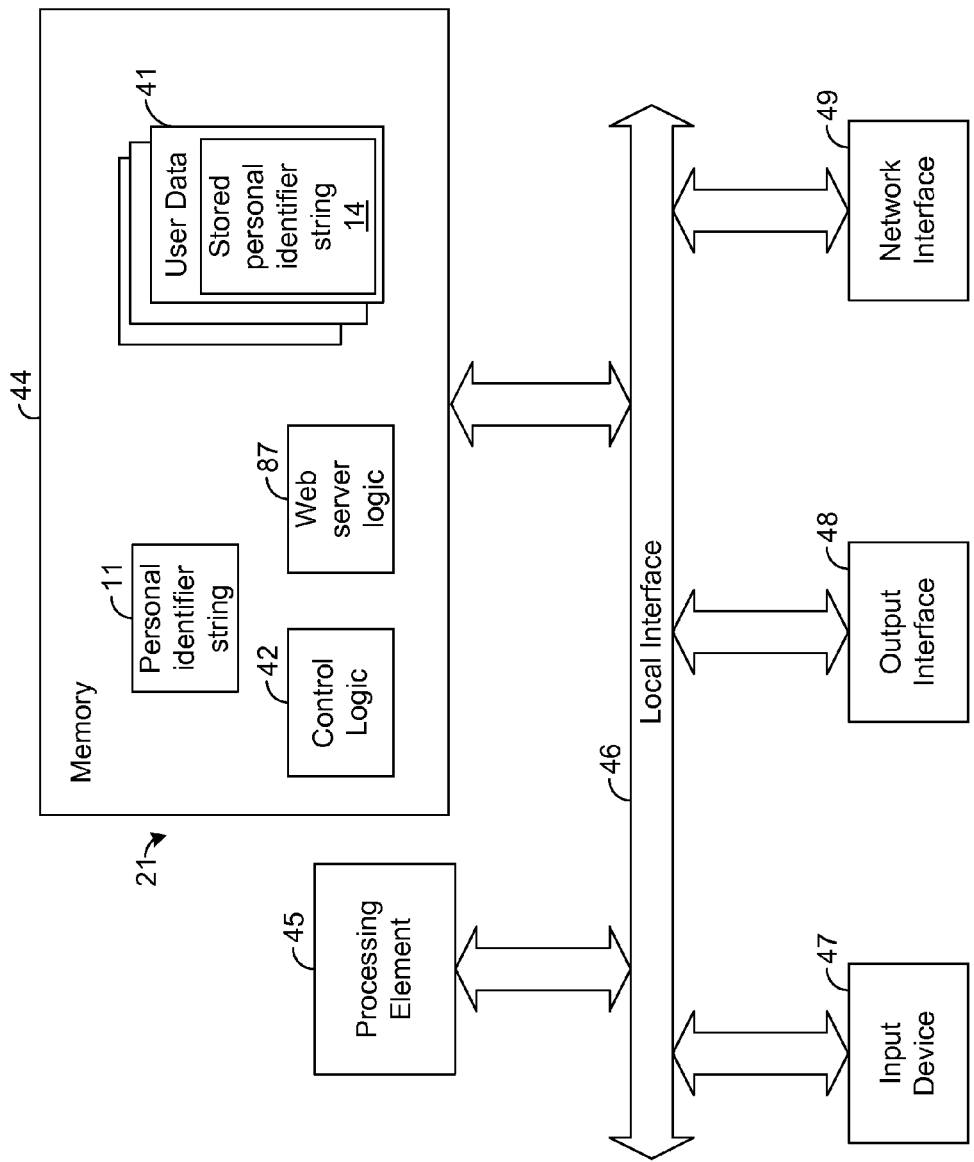
FIG. 2 is a block diagram illustrating an exemplary embodiment of a partner computing apparatus, such as is depicted by FIG. 1.

FIG. 2 depicts an exemplary embodiment of the partner computing apparatus 21 depicted in FIG. 1A. As shown by FIG. 2, the partner computing apparatus 21 comprises control logic 42, web server logic 87, and user data 41 stored within memory 44. Periodically, the personal identifier string 11 is also stored in memory 44.

The control logic 42 generally controls the operation of the partner computing apparatus 21, as will be described in more detail hereafter. It should be noted that the control logic 42 can be implemented in software, hardware, firmware or any combination thereof. In an exemplary embodiment illustrated in FIG. 2, the control logic 42 is implemented in software and stored in memory 55 of authentication facilitator 25.

Note that the control logic 42, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the partner computing apparatus 21 depicted by FIG. 2 comprises at least one conventional processing element 45, such as a digital signal processor (DSP) or a central processing unit (CPU), that communicates to and drives the other elements within the partner computing apparatus 21 via a local interface 46, which can include at least one bus. Further, the processing element 45 is configured to execute instructions of software, such as the control logic 42. An input interface 47, for example, a keyboard, keypad, or mouse, can be used to input data from a user of the partner computing apparatus 21, and an output interface 48, for example, a printer or display screen (e.g., a liquid crystal display (LCD)), can be used to output data to the user. In addition, a network interface 49, such as a modem, enables the apparatus 21 to communicate with the network 22.

As indicated hereinabove, the user data 41 is stored in memory 44. The user attributes for a given user are established during a registration process when the user registers with the partner computing apparatus 21, which is described herein. The user data 41 may comprise data indicative of the user's name, address, or account number. In addition, the user data 41 comprises the stored personal identifier string 14. The stored personal identifier string 14 is the personal identifier 13, which may be in a hashed representation or the actual data, described hereinabove. If the stored personal identifier string 14 is a hashed representation of the personal identifier 13, then the stored personal identifier string 14 is a string of characters from which one would be unable to discern the personal identifier 13.

In one embodiment, during registration, as indicated hereinabove, the control logic 42 generates the stored personal identifier string 14 from the user's personal identifier 13 provided by the user during registration. The translation method used by the partner computing apparatus 21 is the same translation method used by the authentication facilitator 25 (FIG. 1) to translate the personal identifier 13 (FIG. 1) received from the user computing device 79 into the personal identifier string 11. Thus, the personal identifier string 11 and the stored personal identifier string 14 are the same string. As an example, such translation may be performed by applying a hash function to the personal identifier string 13.

In another embodiment, the stored personal identifier string 14 may be the actual data obtained of the personal identifier 13. In such an embodiment, as described hereinabove, the partner computing apparatus 21 may receive the personal identifier string 11, which has been encrypted with a key, from the authentication facilitator 25. The partner computing apparatus 21 decrypts the personal identifier string 11 to obtain the personal identifier 13 and stores the data indicative of the personal identifier string 13 as the stored personal identifier string 14.

Multiple sets (e.g., files or entries) of user data 41 are stored in the memory 44. Each set of user data 41 corresponds to a respective user. Each set of user data 41 has a stored personal identifier string 14 that uniquely identifies the user corresponding to the set of user data. Any number of sets of user data 41 may be stored in the memory 44. As described hereinabove, other attributes of the user may be indicated by the user data 44. The user attributes for the same user are preferably correlated for easy access to such attributes. As an example, the sets of user data 41 may be stored in a database, and all of the user attributes for the same user may be stored in the same entry of the database. Thus, a user attribute, such as the stored personal identifier string 14, may be used as a key to lookup and find the other attributes for the same transaction.

Furthermore, the partner computing device 21 comprises web server logic 87. The web server logic 87, as described hereinabove, delivers web pages to user of the partner computing apparatus 21 through the output device 48 or a remote user on a remote device (not shown).

Figure 3:
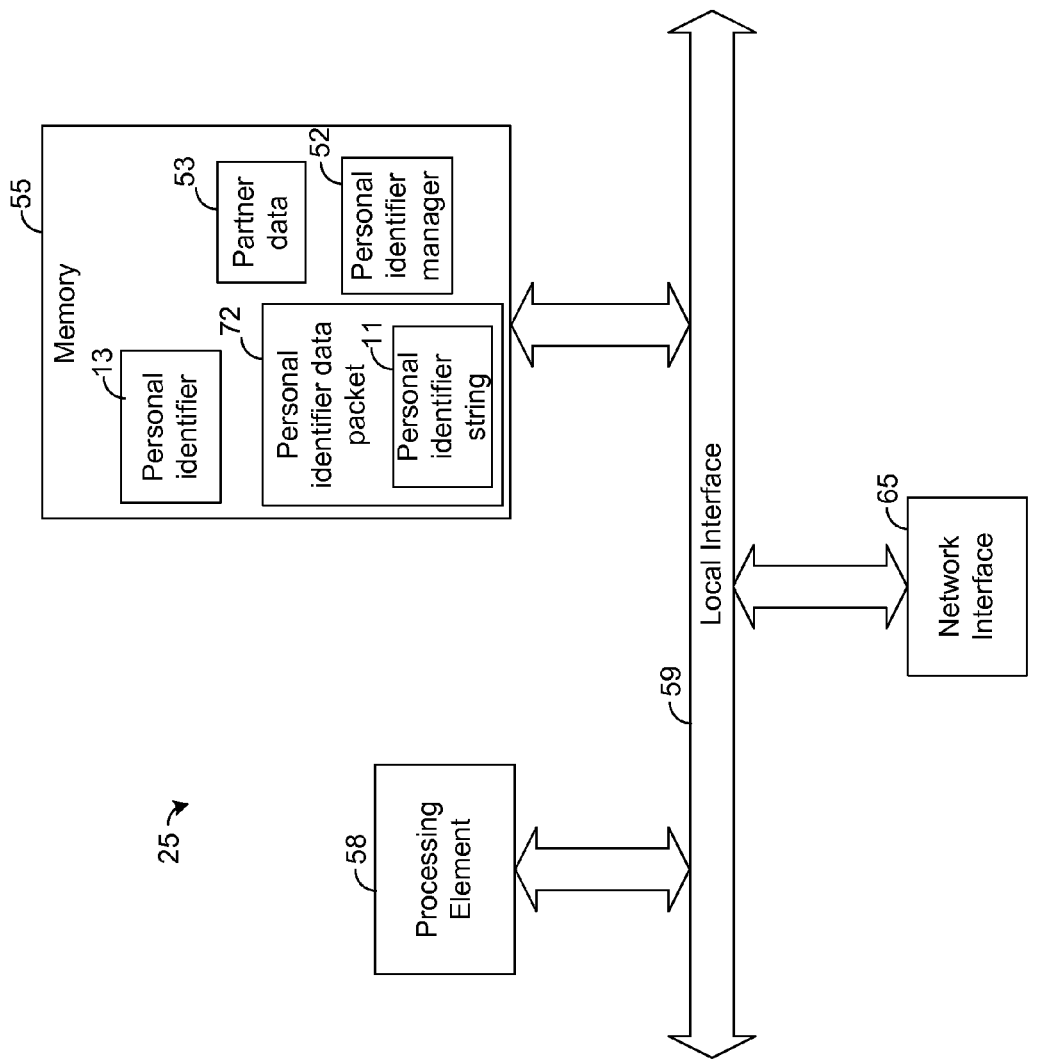
FIG. 3 is a block diagram illustrating an exemplary embodiment of an authentication facilitator, such as is depicted by FIG. 1.

FIG. 3 depicts an exemplary embodiment of the authentication facilitator 25. As shown by FIG. 3, the authentication facilitator 25 comprises a personal identifier manager 52 that generally controls the operation of the authentication facilitator 25. It should be noted that the personal identifier manager 52 can be implemented in software, hardware, firmware or any combination thereof. In an exemplary embodiment illustrated in FIG. 3, the personal identifier manager 52 is implemented in software and stored in memory 55 of authentication facilitator 25.

The exemplary embodiment of the authentication facilitator 25 depicted by FIG. 3 comprises at least one conventional processing element 58, such as a digital signal processor (DSP) or a central processing unit (CPU), that communicates to and drives the other elements within the authentication facilitator 25 via a local interface 59, which can include at least one bus. Further, the processing element 58 is configured to execute instructions of software, such as the personal identifier manager 52, stored in memory 55. In addition, a network interface 65, such as a modem, enables the authentication facilitator 25 to communicate with the network 22 enables the authentication facilitator 25 to communicate with the network 22.

As shown by FIG. 3, personal identifier 13 and personal identifier data packet 72 comprising a personal identifier string 11 are stored in memory 55. The personal identifier 13 is data indicative of a unique personal data entered by a user at the input device 94 (FIG. 1) of the user computing device 79 (FIG. 1). In one embodiment, the personal identifier string 11 is a string of data that is the result of translating the personal identifier 13 into a personal identifier string 11 by some type of translation method, such that one would be unable to discern the personal identifier 13 from the personal identifier string 11. In this regard, in one embodiment, the personal identifier manager 52 may applies a hash function to the personal identifier 13 to obtain the personal identifier string 11 and transmits the personal identifier string 11 to the partner computing apparatus 21.

In another embodiment, the personal identifier manager 52 may use a pre-transmitted encryption key to encrypt the personal identifier 13 into the personal identifier string 11, which is transmitted to the partner computing apparatus 21. Upon receipt, the partner computing apparatus 25 decrypts the personal identifier string 11 to obtain the actual data of the personal identifier 13 and stores the actual data as the personal identifier 13.

Further, the partner data 53 is stored in memory 55 during a set up process. The partner data 53 may comprise an address of the user computing device 79 correlated in memory 55 with an address of the partner computing apparatus 21 and an address of the authentication facilitator 52. In this regard, each user computing device 79 on the network 22 is associated with a particular authentication facilitator 25 and a particular partner computing apparatus 21. For example, the addresses may be data such as an internet protocol (IP) addresses for the partner computing apparatus 21 and the user computing device 79, and the authentication facilitator 52. Other types of partner data may be used in other embodiments.

The personal identifier manager 52 generates the personal identifier data packet 72. The personal identifier data packet 72 comprises at least the personal identifier sting 11. Further, the personal identifier data 72 may also comprise, for example, the partner computing apparatus IP address. The personal identifier manager 52 transmits the personal identifier data packet 72 to the partner computing apparatus 21.

Figure 4:
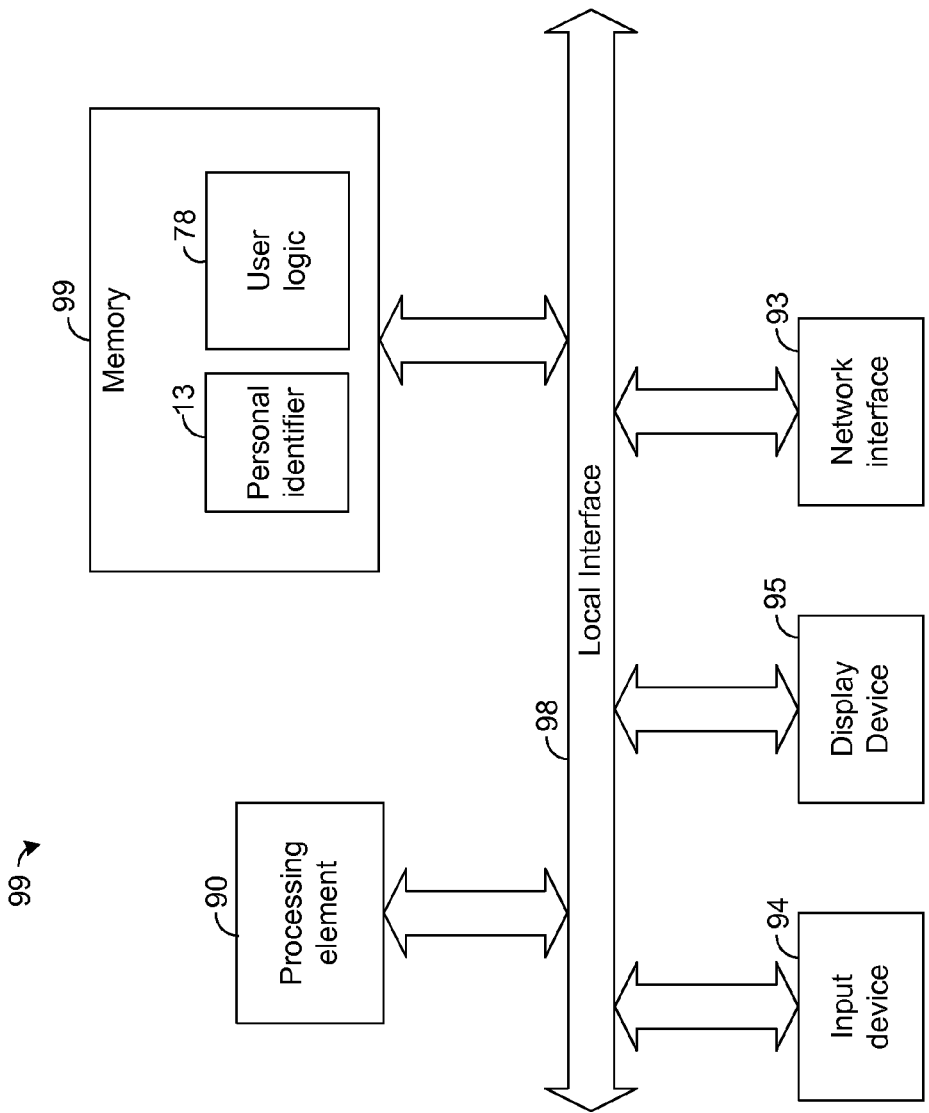
FIG. 4 is a block diagram illustrating an exemplary embodiment of an input device, such as is depicted by FIG. 1.

FIG. 4 depicts an exemplary embodiment of the user computing device 79. As shown by FIG. 4, the user computing device 79 comprises user logic 78 and the personal identifier 13 stored within memory 99. The user logic 78 generally controls the operation of the user computing device 79, as will be described in more detail hereafter. It should be noted that the user logic 78 can be implemented in software, hardware, firmware or any combination thereof. In an exemplary embodiment illustrated in FIG. 4, the user logic 79 is implemented in software and stored in memory 99.

The exemplary embodiment of the user computing device 79 depicted by FIG. 4 comprises at least one conventional processing element 90, such as a digital signal processor (DSP) or a central processing unit (CPU), that communicates to and drives the other elements within the user computing device 79 via a local interface 98, which can include at least one bus. Further, the processing element 90 is configured to execute instructions of software, such as the user logic 78. An input device 94, for example, a keyboard, keypad, or mouse, can be used to input data from a user of the user computing device 79, and a display device 95, for example, a display screen (e.g., a liquid crystal display (LCD)), can be used to output data to the user. In addition, a network interface 93, such as a modem, enables the user computing device 79 to communicate with the network 22.

Further, the personal identifier 13 is periodically stored in memory 99. In this regard, the user initializes the user computing device 79. In one embodiment, the user may press a button (not shown) on the input device 94. In another embodiment, the display device 95 may be a touch screen, and in order for the user to initialize (or turn on) the device, the user touches the touch screen. The user logic 79 displays a plurality of selectable buttons 151-161 (FIG. 5) for selection by the user, and the user logic 79 saves the user input as the personal identifier 13.

To further illustrate, a partner computing apparatus 21 may set up numerous user computing device on the network 22. When the user computing device 79 is set up on the network 22, the user computing device 79 is provided an input device address and an authentication facilitator address. Also, during the set up process one or more authentication facilitators 25 are placed on the network 22. Each of the authentication facilitators 25 may be provided partner data 53 for each of the authentication facilitators 25 that are to use the authentication facilitator 25 in order to gain access.

During registration, a user may contact the partner and provide his/her user data 41, except for the personal identifier. The user may be provided an electronic card having a registration number in the bar code or a registration code that the user enters in the input device 94. The user may then be identifiable by the user computing device 79, for example with the electronic card or the registration code. In response to reading the card or the registration code, the user computing device 79 transmits a message to the authentication facilitator 25 indicating a first secured data transaction. Such message may include, for example, the user's name, the input device address, the partner computing apparatus address, and the authentication facilitator address.

The personal identifier manager 52 responds by displaying the GUI, as described hereinabove, to obtain the user's personal identifier 13. If it is the first time the user is using the user computing device 79, the authentication facilitator 25 may have the user enter his/her personal identifier 13 twice. The personal identifier 13 is stored in the user computing device 79 and transmitted twice to the authentication facilitator 25. The authentication facilitator 25 ensures that the personal identifier 13 received from the user computing device 79 the first time matches the personal identifier 13 received from the user computing device 79 the second time. If it does not, the authentication facilitator 25 may transmit a GUI (not shown) that requests that the user try again to enter his/her personal identifier 13.

In one embodiment, if they do match, the personal identifier manager 52 applies a hash function to the personal identifier 13 to obtain the personal identifier string 11. Additionally, the personal identifier manager 52 transmits data indicative of the user's name and the personal identifier string 11 to the partner computing apparatus 21. Upon receiving the personal identifier string 11 and the user's name, the partner computing apparatus 21 stores the hashed personal identifier string 11 in the user data 41 (FIG. 2) corresponding to the user's name in the data received from the authentication facilitator 25. Note that in this embodiment, the personal identifier string 11 is hashed. Therefore, no one can obtain the personal identifier 13 of the user by hacking the partner computing apparatus 21.

In another embodiment, similar to the previous embodiment, the user enters his/her personal identifier 13, which the user computing device 79 transmits to the authentication facilitator 25. However, in such an embodiment, the partner computing apparatus 21 expects to receive a personal identifier string 11 from which the actual data of the personal identifier 13 can be obtained. Thus, the personal identifier manager 52 encrypts the personal identifier 13 using a key previously provided by the partner computing apparatus 21 to obtain the personal identifier string 11, which the authentication facilitator 25 transmits to the partner computing apparatus 21.

Note that each message transmitted from the user computing device 79 to the authentication facilitator 25 has a header that comprises certain attributes of the user computing device 79. In one exemplary embodiment, the header includes an address (e.g., an IP address) of the user computing device 79, which has been established prior to the secured data transaction being described (e.g., when the partner registers the user computing device 79 with the authentication facilitator 25, as described above. The header also includes an address (e.g., an IP address) of the authentication facilitator 25 to enable the message to be routed to the authentication facilitator 25 by the network 22. The address of the authentication facilitator 25 is stored in the user computing device 79 to be used in headers prior to the user using the user computing device 79. For example, when the partner controlling the partner computing apparatus 21 sets up an user computing device 79 on the network 22, the partner may input the address of the particular authentication facilitator 25 that the user computing device 79 will use to in order to gain access to the building or the section of the website, for example.

Upon receiving a message from the user computing device 79, the personal identifier manager 52 of the authentication facilitator 25 compares various attributes in the header, such as the address of the user computing device 79 to the partner data 53 in order to authenticate the source of the message. In one embodiment, the personal identifier manager 52 locates the particular input device address in the partner data 53. The personal identifier manager 52 compares the authentication facilitator address with the address in the header. If such header information in the message from the user computing device 79 matches the partner data 53, then the authentication facilitator 25 responds to the message and processes the message as appropriate. Otherwise, the authentication facilitator 25 discards the message without further processing it.

In response, the personal identifier manager 52 transmits data defining a graphical user interface (GUI) (e.g., an interactive keypad). At some point, the user logic 78 displays the GUI to the user via the display device 95 (FIG. 4) of the user computing device 79 in order to solicit a personal identifier from the user.

Figure 5:
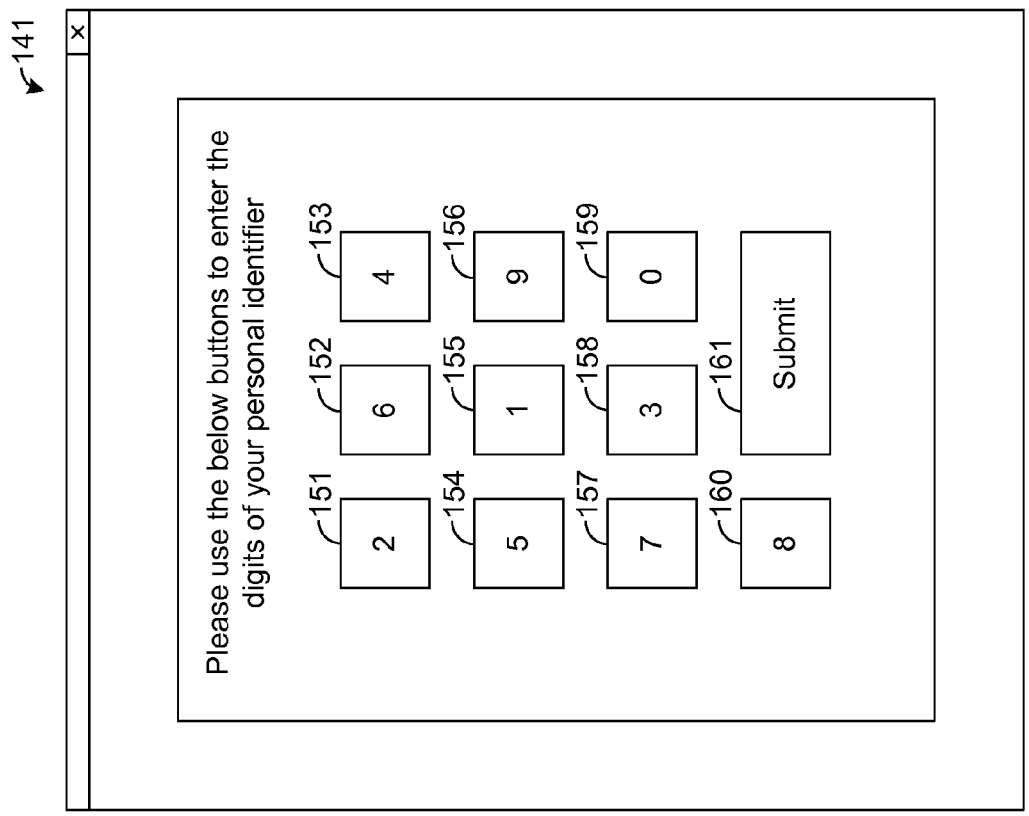
FIG. 5 is a diagram illustrating an exemplary embodiment of graphical user interface (GUI) for soliciting personal identifier information from a user.

In one exemplary embodiment, the GUI from the authentication facilitator 25 has a graphical entry pad having graphical buttons or other graphical elements that can be selected by the consumer to enter characters, such as numbers. FIG. 5 depicts an exemplary GUI 141 that may be received from the authentication facilitator 25. The exemplary GUI 141 of FIG. 5 has a graphical character-entry pad 144 that has a plurality of graphical buttons 151-160. Associated with and displayed on each graphical button 151-160 is a one-digit number. The user enters his or her personal identifier by selecting via a mouse, touch screen, or otherwise the buttons 151-160 associated with the numbers in the personal identifier being entered. In the exemplary embodiment shown by FIG. 5, the associated numbers are scrambled so that they do not appear in consecutive order from lowest to highest, but other arrangements are possible in other embodiments.

Upon entry of the personal identifier 13 by the user, data indicative of the entered personal identifier 13 is stored in memory 99. The personal identifier 13 is transmitted from the user computing device 79 to the authentication facilitator 25 via the network 22 bypassing the partner computing apparatus 21. In one embodiment, as described hereinabove, the personal identifier 13 is translated and transmitted with a header including the address of the user computing device 79 and the address of the authentication facilitator 25. In one exemplary embodiment, the actual values of the personal identifier 13 are transmitted to the authentication facilitator 25. Instead, for each button selection, rather than transmitting the button's associated digit number, the screen coordinates of the selected button are transmitted to the authentication facilitator 25. Such screen coordinates are later translated by the authentication facilitator 25 into the digit number associated with the selected button. Thus, the authentication facilitator 25 recovers, from the screen coordinates, the values of the user's personal identifier 13 entered via the GUI 141. Exemplary techniques for translating between screen coordinates and input selections are described in commonly-assigned U.S. Pat. No. 6,209,104, entitled "Secure Data Entry and Visual Authentication System and Method" and filed on Dec. 1, 1997, which is incorporated herein by reference. Before transmitting the personal identifier 13 to the authentication facilitator 25, the user logic 78 may encrypt the personal identifier 13 using an encryption key. In such an embodiment, the authentication facilitator 55 may have stored in the partner data 53, an encryption key (which may be provided by the partner when the authentication facilitator 25 is set up on the network).

The personal identifier manager 52 receives the encrypted personal identifier 13 from the user computing device 79 and decrypts the personal identifier 13. Based on the decrypted data, the personal identifier manager 52 determines the personal identifier 13 of the user. For example, if the user computing device 79 transmitted characters of the user's personal identifier 13 rather than screen coordinates, then the personal identifier manager 52 may determine personal identifier 13 simply by decrypting the message or messages containing such characters. If, however, the screen coordinates are transmitted, as described above, then the personal identifier manager 52 decrypts the message or messages containing the coordinates and then translates the coordinates into the character string originally selected by the consumer via the GUI 141.

After determining and storing the personal identifier 13 in memory 55, the personal identifier manager 52 translates the personal identifier 13 into the personal identifier string 11. As described hereinabove, the translation method used by the personal identifier manager 52 may be accomplished by applying a hash function to the personal identifier 13 in an embodiment where the partner computing apparatus 21 does not need to obtain the actual data of the personal identifier 13. If the partner computing apparatus 21 needs to obtain the actual data of the personal identifier 13, the personal identifier manager 52 encrypts the personal identifier 13 using an encryption key previously provided by the partner computing apparatus 21. In one embodiment, the encryption key may be stored in the partner data 53 correlated with the partner computing apparatus address and the input device address. Such encryption key may be stored in the partner data 53 manually at the time the authentication facilitator 25 is set up. In another embodiment, the authentication facilitator 25 may determine from the partner data 53 the partner computing apparatus address and transmit a request to the partner computing apparatus 21 requesting the encryption key for the identified user computing device 79. The partner computing apparatus 21 receives the message, and in response, sends the authentication facilitator 25 the encryption key that the personal identifier manager 52 uses to encrypt the personal identifier 13 into the personal identifier string 11.

Note that the encryption key corresponds to another key used by the partner computing apparatus 21 to decrypt the personal identifier 13 once the personal identifier string 11 is received by the partner computing apparatus 11. The authentication facilitator 25 transmits the personal identifier data packet 72 comprising the personal identifier string 11 to the partner computing apparatus 21. In one embodiment, upon receipt of the personal identifier data packet 72, the partner computing apparatus 21 compares the personal identifier string 11 received from the authentication facilitator 25 with the stored personal identifier string 14 stored in the user data 41. If the personal identifier string 11 matches a stored personal identifier string 14 stored in the partner computing apparatus 21, the partner computing apparatus 21 transmits a signal to one of the accessed devices, for example 87 and 88. In one embodiment, the accessed device 88 may comprise a door 29 that the signal actuates. The authorization message sent by the partner computing apparatus 21 enables access of the user. In another embodiment, the accessed device may comprise web server logic 87, and the signal causes the web server logic 87 to enable the user access to a secured portion of a website, as described hereinabove.

Accordingly, in one embodiment, the transaction is completed without the partner obtaining access to the personal identifier 13. In such an embodiment, the system 15 mitigates the risk that someone other than the user will obtain personal identifier 13. In this regard, since the partner never has access to the personal identifier 13, vulnerabilities associated with the partner, such as unscrupulous employees or hacking of the partner's database, do not result in the complete identifier being learned by an unauthorized user.

It should be noted that the embodiments described above are exemplary, and various modifications and changes to the described embodiments are possible. As an example, various types of personal identifiers can be used, and any portion of a personal identifier can be transmitted to the authentication facilitator 25. As an example, GUI types and graphical interface elements other than those specifically described herein may be used to solicit information from the user. In one exemplary embodiment, a separate GUI is unnecessary. Yet other changes and modifications would be apparent to a person of ordinary skill upon reading this disclosure.

An exemplary embodiment of a use and operation of the system 15 will now be described with particular reference to FIGS. 6-8.

For illustrative purposes, assume that a user needs access to a building, and the user goes to a security office that is operated by one or more personnel. The partner is the controller/owner of the partner computing apparatus 21. In step 201, the partner computing apparatus 21 receives a portion of the user data 41, not including the stored personal identifier string 14. In this regard, the security office may manually enter the user's information into an input device 47, which is stored as user data 41. In another embodiment, the partner computing apparatus 21 may have a website on which the user could enter his/her user data 41. The security office may provide the user a card with his/her user data 41 contained in the bar code on the card (for example a disposable card having a bar code on the back). In another embodiment, the security office may issue the user a registration number to enter into the user computing device 79 to set up his/her password.

The user goes to the user computing device 79 and scans the registration card or enters his/her registration number into the user computing device 79. The user logic 78 displays a GUI, and the user enters his/her access code. The authentication facilitator 25 translates the personal identifier 13 into the personal identifier string 11 and transmits the personal identifier string 11 to the partner computing apparatus 21. The partner computing apparatus stores the stored personal identifier string 14 in the user data 41. Thus, with respect to step 202, the partner computing apparatus 21 receives the stored personal identifier string 14.

Initially, the user initializes the user computing device 79 by touching a button or a touch screen of the user computing device 79. In response, in step 218 of FIG. 8, the user logic 78 transmits a request to the authentication facilitator 25, and a connection is made through the network 22 between the user computing device 79 and the authentication facilitator 25. The request transmitted indicates that the request is a registration request. Note that at least a portion of any connection described herein may be wireless, if desired. For example, the user logic 78 may communicate wirelessly with the network 22.

Figure 7:
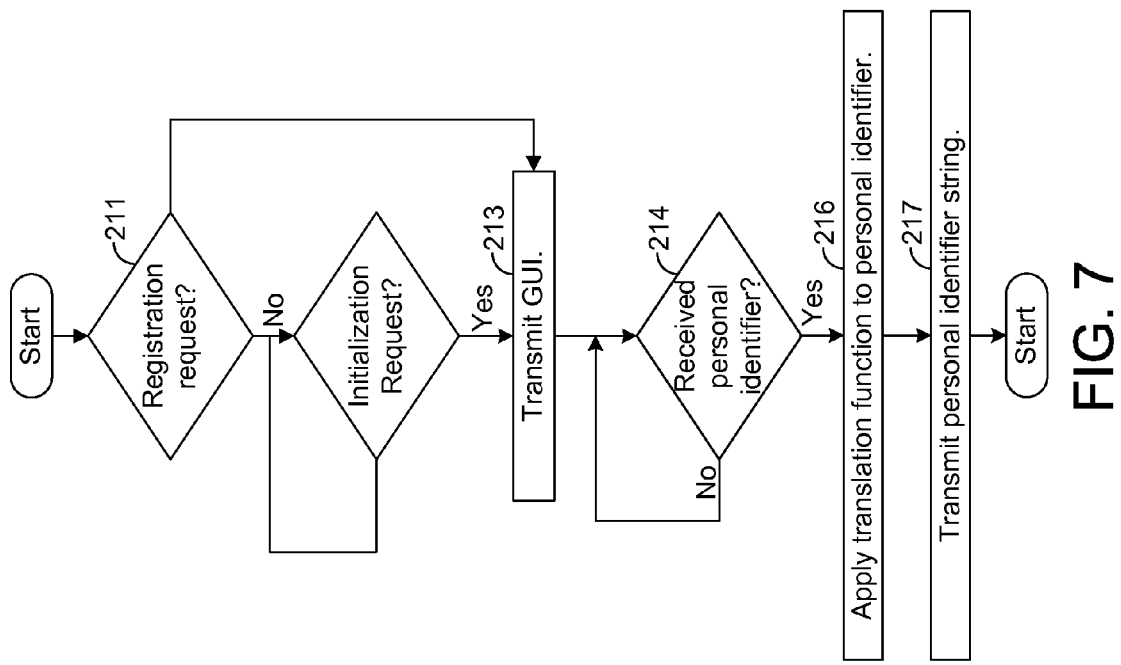
FIG. 7 is a flow chart illustrating an exemplary method implemented by an authentication facilitator, such as is depicted by FIG. 1.

In step 211 of FIG. 7, if the authentication facilitator 25 receives the registration request from the user logic 78, the personal identifier manager 52 transmits a GUI 141 to the user computing device 79 in step 213. In one embodiment, as described herein, the personal identifier manager 52 transmits coordinates defining a GUI, and the user logic 78 translates the coordinates into locations on the display device 95.

Figure 8:
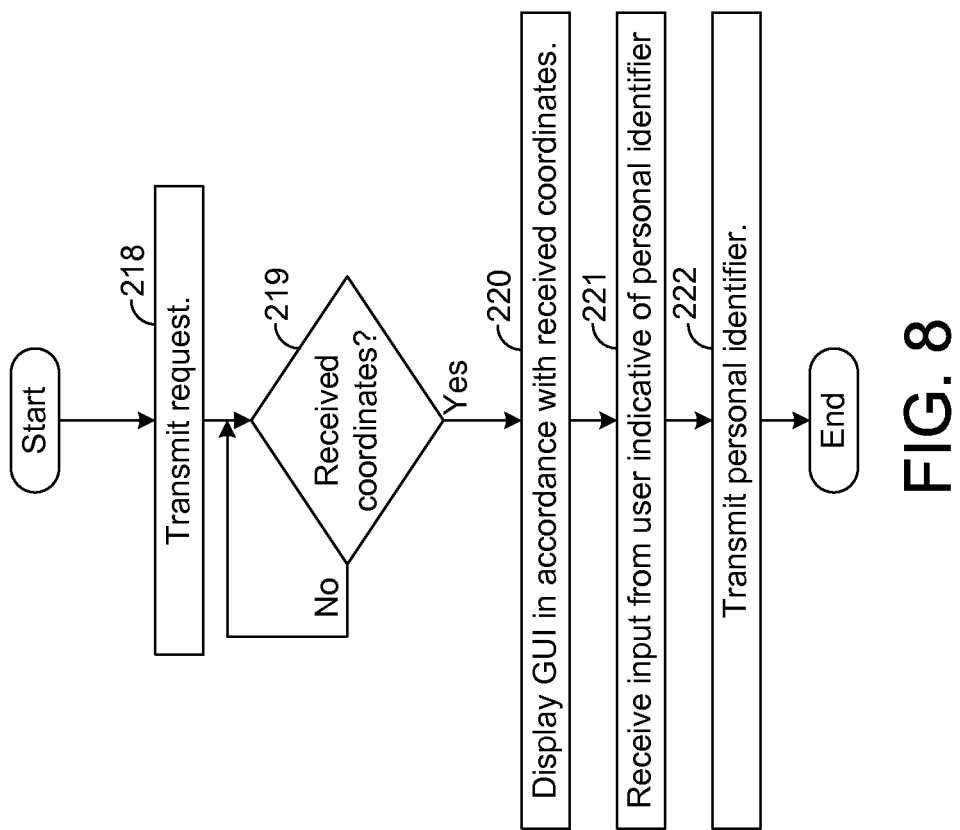
FIG. 8 is a flow chart illustrating an exemplary method implemented by an input device, such as is depicted by FIG. 1.

In step 219 of FIG. 8, if the user logic 78 receives the coordinates indicative of a GUI, the user logic 78 translates the coordinates into locations and displays the GUI 141 in step 220. When the user sees the GUI 141 displayed to the display device 95, the user enters a desired personal identifier using one or more buttons on the GUI 141. In this regard, the user may use his/her finger when the display device 95 is a touch screen (or a mouse). Thus, in step 221, the user logic 78 receives input from the user indicative of the user's personal identifier 13. The user logic 78 stores the digits entered as personal identifier 13 and transmits the personal identifier 13 to the authentication facilitator 25, in step 222. In one embodiment, prior to transmitting the personal identifier 13, the user logic 78 translates the personal identifier 13 to coordinates, encrypts the coordinates, and transmits the encrypted coordinates to the authentication facilitator 25.

If the personal identifier manager 52 receives coordinates in step 214, the personal identifier manager 52 obtains the personal identifier 13 from the coordinates received. In step 216, the personal identifier manager 52 applies a translation function to the personal identifier 13. In this regard, the personal identifier manager 52 translates the personal identifier 13 into a personal identifier string 11, which is an unrecognizable string representation of the personal identifier 13. In step 217, the personal identifier manager 52 transmits the personal identifier string 11 to the partner computing apparatus 21. With the personal identifier string 11, the personal identifier manager 52 also transmits user identifier, such as for example the user's name.

Figure 6:
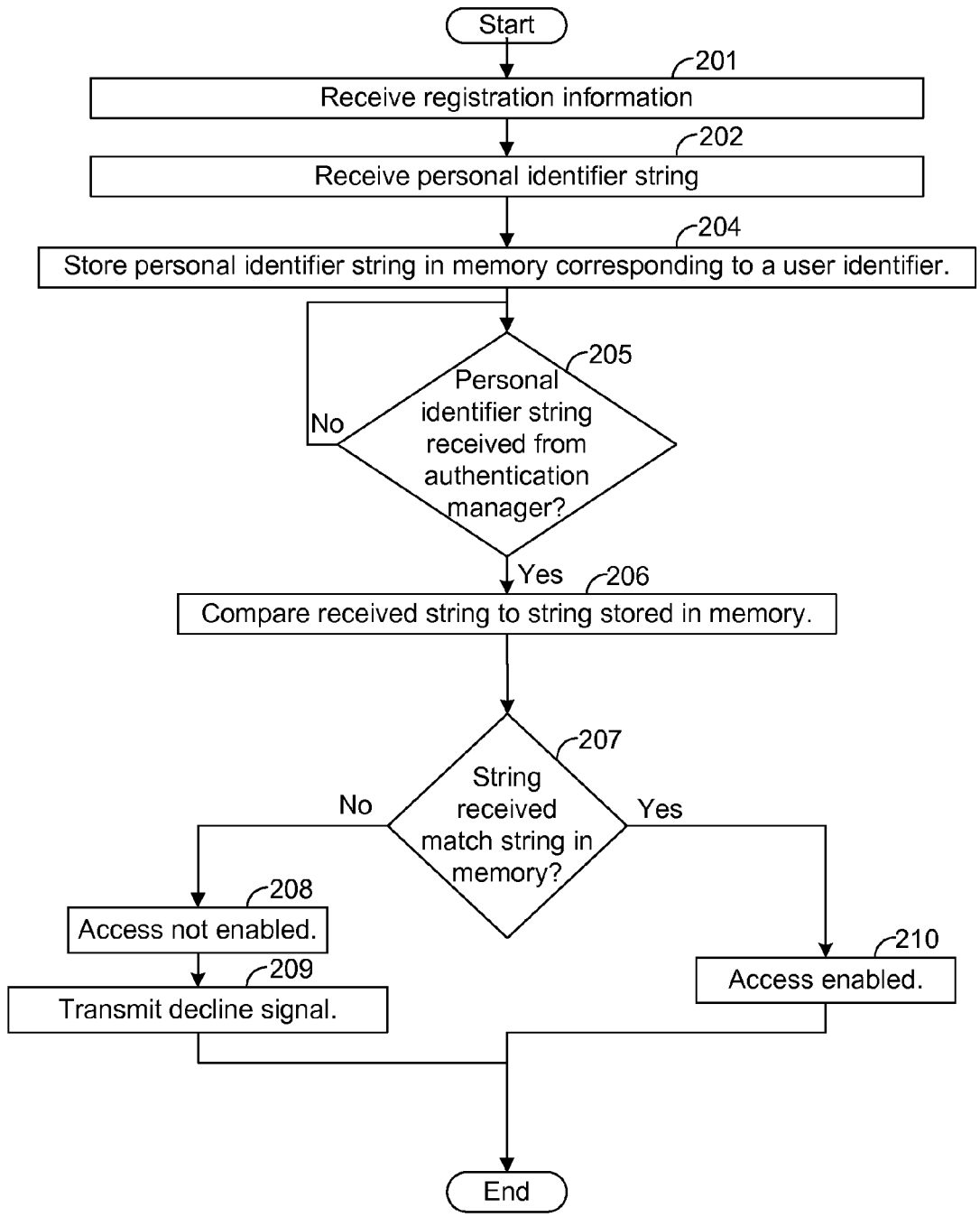
FIG. 6 is a flow chart illustrating an exemplary method implemented by a partner computing apparatus, such as is depicted by FIG. 1.

In step 202 of FIG. 6, the control logic 42 receives the personal identifier string 11 and other data from the authentication facilitator 25. In step 204 of FIG. 6, the control logic 42 of the partner computing apparatus 21 stores the stored personal identifier string 14 in memory 44 corresponding to the user data 41 identified by user identifier. The user is then registered partner computing apparatus 21.

Once the user has registered, the user may then enter the door by simply entering his/her personal identifier 13 into the display device 95 of the user computing device 79. When the user touches an initialization button or the touch screen, the user logic 78 transmits a request to the authentication facilitator 25 as indicated in step 218 of FIG. 8. In this request, the request indicates that the request is an initialization request. In step 212, if the request is an initialization request, the personal identifier manager 52 behaves similarly as it did with respect to the registration process. In this regard, in step 213, the personal identifier manager 52 transmits a GUI to the user computing device 79.

In step 219 of FIG. 8, if the user logic 78 receives the coordinates indicative of a GUI, the user logic 78 translates the coordinates into locations and displays the GUI 141 in step 220. When the user sees the GUI 141 displayed to the display device 95, the user enters his/her personal identifier using one or more buttons on the GUI 141. In step 221, the user logic 78 receives input from the user indicative of the user's personal identifier. The user logic 78 stores the numbers entered as personal identifier 13 and transmits the personal identifier 13 to the authentication facilitator 25, in step 222.

If the personal identifier manager 52 receives coordinates in step 214, the personal identifier manager 52 obtains the personal identifier 13 from the coordinates received. In step 216, the personal identifier manager 52 applies a translation function to the personal identifier 13. In this regard, the personal identifier manager 52 translates the personal identifier 13 into a personal identifier string 11, which is an unrecognizable string representation of the personal identifier 13. In step 217, the personal identifier manager 52 transmits the personal identifier string 11 to the partner computing apparatus 21.

With respect to FIG. 6, if the partner computing apparatus 21 receives an personal identifier string 11 from the authentication facilitator 25 in step 205, the control logic 42 compares the personal identifier string 11 received and the stored personal identifier string 14. If the personal identifier string 11 received and the stored personal identifier string 14 match, then the control logic 42 enables access for the user, in step 210. In the example provided, the control logic 42 may send a signal to the door coupled to the user computing device 79 that opens the door.

If the personal identifier string 11 received and the stored personal identifier string 14 do not match, then the control logic 42 does not enable access for the user, in step 208. In addition, the control logic 42 may transmit a decline signal to a device on the door 29 that indicates that the door 29 is not opening.

Another exemplary embodiment of a use and operation of the system 15 will now be described with particular reference to FIGS. 9, 10, and 8.

For illustrative purposes, assume that a user desires to transmit personal data to the partner computing apparatus 21. However, the data that the user desires to transmit to the partner computing apparatus 21 is private, and if another individual were to obtain the information, the user may encounter difficulties. For example, the user may desire to send his/her social security number to the partner computing device 21 to set up an account, obtain a loan, or retrieve a credit report. If the other individual were to obtain the user's social security number, the other individual may be able to steal the user's identity and obtain loans, open credit cards, or other nefarious actions.

Figure 9:
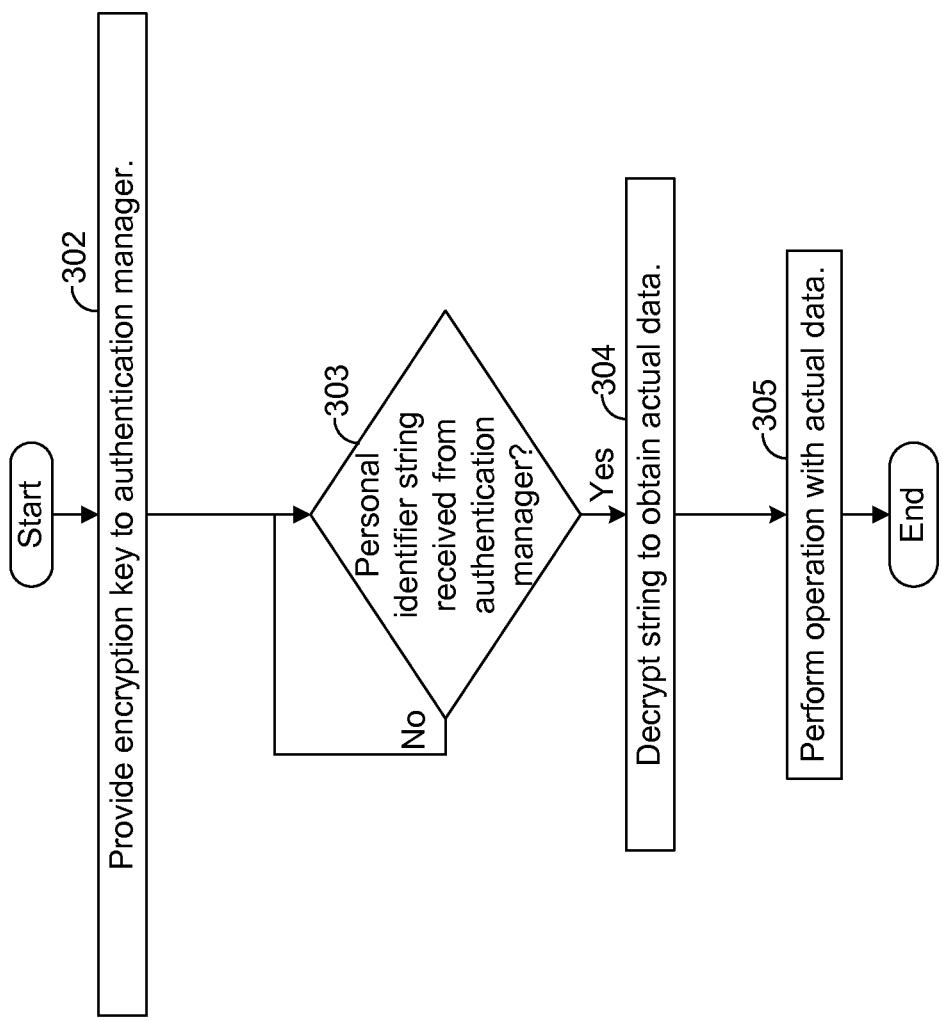
FIG. 9 is a flow chart illustrating another exemplary method implemented by a partner computing apparatus, such as is depicted by FIG. 1.

With respect to FIG. 9, during a previous set up process, the partner computing apparatus 21 registers with the authentication facilitator 25. Thus, in step 302, the partner computing apparatus 21 transmits or provides an encryption key to the authentication manager 302. Additionally, the partner computing apparatus 21 may provide other identifying information, such as a unique identifier, that the authentication facilitator 25 may associate with the key. In step 306 in FIG. 10, the authentication manager stores the received encryption key in association with the partner computing apparatus 21, for example in association with the partner computing apparatus identifier. Note that step 302 and 306 may be performed at any time prior to the actual receipt and transmission of data to the partner computing apparatus 21.

With respect to FIG. 8, the user computing device 79 transmits an initialization request to the authentication facilitator 25 in step 218. In step 307 in FIG. 10, the authentication facilitator 25 receives the initialization request. In one embodiment, the authentication facilitator 25 may receive the initialization request from a standalone input device, such as for example a user computing device 79 connected to a facility. In other embodiments, the authentication facilitator 25 may receive the initialization request from an user computing device 79 communicatively coupled to a third party computing device (not shown) and controlled by third party logic (not shown). For example, the user may be using a web page and entering information through the user computing device 79 into one or more text fields (not show). One or more of the text fields in which the user is entering personal information may be for entering personal information that the third party has determined should be transmitted and stored securely (hereinafter a "secured text field"). In such an embodiment, when the user selects the secured text field the third party logic (not shown) may send an initialization request to the authentication facilitator 25. Thus, a connection is made through the network 22 between the third party logic and the authentication facilitator 25. Note that at least a portion of any connection described herein may be wireless, if desired. For example, the third party logic may communicate wirelessly with the network 22.

In response to the initialization request, the personal identifier manager 52 transmits a GUI 141 to the user computing device 79 in step 308. The GUI may comprises any number of text fields in which the user can enter information, for example his/her social security number.

In step 219 of FIG. 8, if the third party device receives the coordinates indicative of the GUI 141, the user logic 78 translates the coordinates into locations and displays the GUI 141 in step 220. When the user sees the GUI 141 displayed to the display device 95, the user enters a desired personal identifier using one or more buttons on the GUI 141. In this regard, the user may use his/her finger when the display device 95 is a touch screen (or a mouse). Thus, in step 221, the user logic 78 receives input from the user indicative of the user's personal identifier 13. The user logic 78 stores the digits entered as personal identifier 13 and transmits the personal identifier 13 to the authentication facilitator 25, in step 222. In one embodiment, prior to transmitting the personal identifier 13, the user logic 78 translates the personal identifier 13 to coordinates, encrypts the coordinates, and transmits the encrypted coordinates to the authentication facilitator 25.

Figure 10:
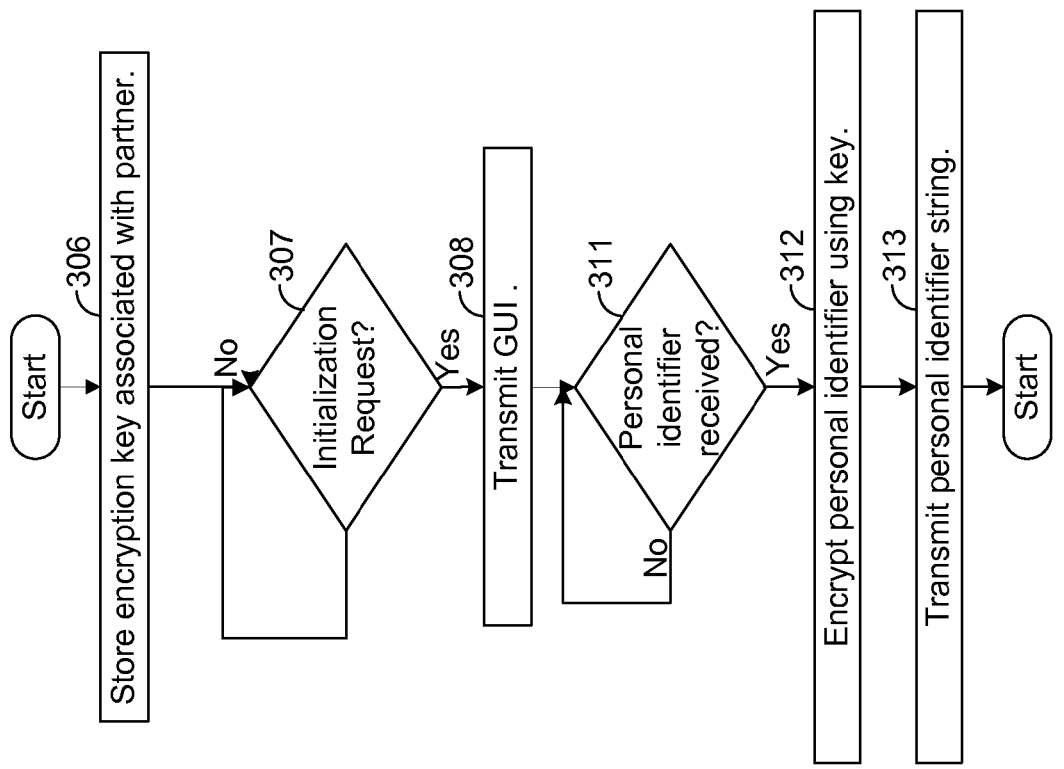
FIG. 10 is a flow chart illustrating another exemplary method implemented by an authentication facilitator, such as is depicted by FIG. 1.

If the personal identifier manager 52 receives coordinates in step 311 of FIG. 10, the personal identifier manager 52 obtains the personal identifier 13 from the coordinates received. In step 312, the personal identifier manager 52 encrypts the personal identifier 13 received and translated using the encryption key previously provided by the partner computing apparatus 21. In step 313, the personal identifier manager 52 transmits the personal identifier string 11 to the partner computing apparatus 21. In one embodiment, the personal identifier manager 52 also transmits a user identifier, such as for example the user's name or unique user identifier.

In step 303 of FIG. 9, the control logic 42 receives the personal identifier string 11 and other data sent by the authentication facilitator 25. In step 304, the control logic 42 of the partner computing apparatus 21 decrypts the received personal identifier string 11 using a decryption key corresponding to the encryption key provided previously to the authentication facilitator 25. When the partner computing apparatus 21 decrypts the personal identifier string 11, the partner computing apparatus 21 possesses the actual data entered by user in the user computing device 79.

Once the personal identifier string 11 is decrypted, the partner computing apparatus can perform any type of operation with the actual data obtained. As an example, the partner computing apparatus 21 may store the personal identifier string 11 in memory 44 corresponding to the user data 41 identified by user identifier. As another example, the partner computing apparatus 21 may set up an account for the user using the user identifier and the personal identifier string 11.

Now, therefore, the following is claimed:

1. A system, comprising:
a user computing device having a display device, the user computing device configured to receive, via a network, data indicative of a graphical key pad and to display via the display device the graphical key pad based on the data, wherein the user computing device is configured to receive user input for selecting icons of the graphical key pad, each selection of an icon of the graphical key pad by the user input representing at least one character of a personal identifier (PI) for authenticating a user of the user computing device, the user computing device further configured to transmit, via the network, icon location data indicative of screen locations of the selected icons in response to the user input;
an authentication facilitator configured to transmit the data indicative of the graphical key pad to the user computing device via the network and to receive from the user computing device via the network the icon location data indicative of the screen locations of the selected icons, the authentication facilitator further configured to recover the PI based on the icon location data and to translate the recovered PI to obtain a translated PI, the authentication facilitator further configured to transmit the translated PI; and
a partner computing apparatus located remotely from the authentication facilitator and configured to receive the translated PI from the authentication facilitator, the partner computing apparatus further configured to authenticate the user for allowing the user access to a secured area based upon the translated PI.

2. The system of claim 1, wherein the secured area is a secured portion of a website.

3. The system of claim 1, wherein the secured area is a secured facility.

4. The system of claim 1, wherein the partner computing apparatus stores a first hashed PI for subsequent retrieval.

5. The system of claim 4, wherein the authentication facilitator translates the recovered PI to a second hashed PI.

6. The system of claim 5, wherein the authentication facilitator transmits the second hashed PI to the partner computing apparatus and the partner computing apparatus compares the second hashed PI to the first hashed PI.

7. The system of claim 6, wherein the partner computing apparatus enables the user access to a secured portion of a website if the second hashed PI matches the first hashed PI.

8. The system of claim 6, wherein the partner computing apparatus enables the user access to a secured facility if the second hashed PI matches the first hashed PI.

9. The system of claim 1, wherein the partner computing apparatus is further configured to transmit an encryption key to the authentication facilitator.

10. The system of claim 9, wherein the authentication facilitator is further configured to encrypt the recovered PI using the encryption key to obtain the translated PI.

11. The system of claim 10, wherein the authentication facilitator is further configured to transmit the translated PI to the partner computing apparatus.

12. The system of claim 11, wherein the partner computing apparatus is further configured to receive the translated PI and decrypt the translated PI using a decryption key corresponding to the encryption key to decrypt the translated PI.

13. The system of claim 1, wherein the partner computing apparatus comprises web server logic for providing a website, wherein the secured area is a secured portion of the website, wherein the partner computing apparatus, in response to an input from the user computing device for selecting the secured portion for access, is configured to redirect the user computer device to the authentication facilitator such that the authentication facilitator transmits the data indicative of the graphical key pad to the user computing device via the network.

14. The system of claim 1, wherein the network is a wide area network (WAN).

15. A method for transferring secured data, comprising:
transmitting data indicative of a graphical key pad from an authentication facilitator to a remote user computing device via a network;
displaying the graphical key pad at the user computing device based on the data indicative of the graphical key pad;
selecting icons of the graphical key pad via user input at the user computing device, each selection of an icon of the graphical key pad in the selecting representing at least one character of a personal identifier (PI) for authenticating a user of the user computing device;
transmitting from the user computing device to the authentication facilitator via the network icon location data indicative of screen locations of the selected icons in response to the user input;
recovering the PI based on the transmitted icon location data to obtain a recovered PI;
translating the recovered PI to obtain a translated PI;
transmitting the translated PI to a partner computing apparatus;
authenticating the user via the partner computing apparatus based on the translated PI; and
allowing the user access to a secured area based upon the authenticating.

16. The method of claim 15, wherein the allowing comprises allowing the user access to a secured portion of a website.

17. The method of claim 15, wherein the allowing comprises allowing the user access to a secured portion of a facility.

18. The method of claim 15, further comprising:
applying a hash function to the PI resulting in a first hashed PI; and
storing the first hashed PI for subsequent retrieval.

19. The method of claim 18, wherein the translating comprises applying a hash function to the recovered PI to obtain a second hashed PI.

20. The method of claim 19, further comprising comparing the second hashed PI to the first hashed PI.

21. The method of claim 20, wherein the allowing comprises enabling the user access to a secured portion of a website if the second hashed PI matches the first hashed PI.

22. The method of claim 20, wherein the allowing comprises enabling the user access to a secured facility if the second hashed PI matches the first hashed PI.

23. The method of claim 15, further comprising transmitting an encryption key.

24. The system of claim 23, wherein the translating comprises encrypting the recovered PI using the encryption key to obtain the translated PI.

25. The method of claim 24, further comprising transmitting the translated PI.

26. The method of claim 25, further comprising:
receiving the translated PI; and
decrypting the translated PI using a decryption key corresponding to the encryption key to decrypt the translated PI.

27. The method of claim 15, wherein the secured area is a secured portion of a website, the method further comprising:

providing the website via web server logic of the partner computing apparatus;
transmitting to the partner computing apparatus via the network an input from the user computing device for selecting the secured portion for access;
redirecting the user computer device to the authentication facilitator in response to the input from the user computing device,
wherein the transmitting the data indicative of the graphical key pad is performed in response to the redirecting.

* * * * *